US011368199B2

(12) United States Patent
Katsuda et al.

(10) Patent No.: US 11,368,199 B2
(45) Date of Patent: Jun. 21, 2022

(54) WIRELESS COMMUNICATION SYSTEM AND WIRELESS SIGNAL RECEIVING METHOD

(71) Applicant: NIPPON TELEGRAPH AND TELEPHONE CORPORATION, Tokyo (JP)

(72) Inventors: Hajime Katsuda, Musashino (JP); Yosuke Fujino, Musashino (JP); Kazunori Akabane, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/258,422

(22) PCT Filed: Jun. 25, 2019

(86) PCT No.: PCT/JP2019/025092
§ 371 (c)(1),
(2) Date: Jan. 6, 2021

(87) PCT Pub. No.: WO2020/012949
PCT Pub. Date: Jan. 16, 2020

(65) Prior Publication Data
US 2021/0297124 A1   Sep. 23, 2021

(30) Foreign Application Priority Data
Jul. 10, 2018   (JP) .............................. JP2018-130799

(51) Int. Cl.
*H04B 7/06*   (2006.01)
*H04B 7/005*   (2006.01)
(52) U.S. Cl.
CPC ........... *H04B 7/0615* (2013.01); *H04B 7/005* (2013.01)

(58) Field of Classification Search
CPC ......... H04B 7/0615; H04B 7/005; H04B 7/08
See application file for complete search history.

(56) References Cited

U.S. PATENT DOCUMENTS

| 2007/0092044 A1* | 4/2007 | Wang | ................. H04L 27/2662 375/343 |
| 2008/0004078 A1* | 1/2008 | Barratt | ................. H04B 17/309 455/562.1 |

(Continued)

FOREIGN PATENT DOCUMENTS

| JP | 2001326594 A | 11/2001 |
| JP | 201450045 A | 3/2014 |

OTHER PUBLICATIONS

Takeshi Hattori and Masayoshi Fujioka, Revised Wireless Broadband Textbook 3.5G / Next Generation Mobile Edition, Impress, 2006, pp. 118-123.

*Primary Examiner* — Jean B Corrielus

(57) ABSTRACT

A reception unit in a radio communication apparatus receives wirelessly a signal configured with a preamble from another radio communication apparatus. The synchronization detection unit uses the preamble included in the signal received by the reception unit to detect synchronization with another radio communication apparatus. The signal accumulation unit accumulates a signal extracted from the signal received by the reception unit based on a timing at which the synchronization is detected by the synchronization detection unit. The combining unit combines the signals accumulated in the signal accumulation unit in accordance with a blind adaptive array antenna algorithm. The demodulation unit demodulates the signals combined by the combining unit.

12 Claims, 10 Drawing Sheets

(56) References Cited

U.S. PATENT DOCUMENTS

| | | | | |
|---|---|---|---|---|
| 2008/0205568 A1* | 8/2008 | Oyama | ................ | H04B 7/2643 375/365 |
| 2009/0190510 A1* | 7/2009 | Kobayashi | .......... | H04L 27/2678 370/280 |
| 2015/0098491 A1* | 4/2015 | Yano | ...................... | H04B 1/709 375/142 |

* cited by examiner

WIRELESS COMMUNICATION SYSTEM AND WIRELESS SIGNAL RECEIVING METHOD

CROSS-REFERENCE TO RELATED APPLICATIONS

This application is a 371 U.S. National Phase of International Application No. PCT/JP2019/025092, filed on Jun. 25, 2019, which claims priority to Japanese Application No. 2018-130799 filed on Jul. 10, 2018. The entire disclosures of the above applications are incorporated herein by reference.

TECHNICAL FIELD

The present invention relates to a radio communication apparatus and a radio signal reception method.

BACKGROUND ART

In recent years, Internet of Things (IoT) that connects anything located anywhere to the Internet to create new use cases has been actively discussed and introduced. In the IoT, radio communication schemes are often utilized to connect things to the Internet. However, in a case of a fixedly installed type of thing, a surrounding environment that fluctuates as compared to the environment at the time of initial installation will negatively affect the radio wave environment and the radio wave environment may fall out of a serving range.

To flexibly accommodate the fluctuations in the radio wave environment, chase combining is effective (see Non Patent Literature (NPL) 1, for example). Chase combining is a technique in which a transmission side retransmits a same signal many times, and a reception side appropriately combines a same retransmitted signal group, thereby increases a received signal energy to improve a reception sensitivity.

FIG. 11 is a diagram illustrating a configuration example of a reception unit of a radio communication apparatus to achieve chase combining. Note that it is assumed that another radio communication apparatus transmits a same signal multiple times. A receive antenna receives signals transmitted by another radio communication apparatus. A radio unit performs frequency conversion on the received signal to obtain a baseband signal. A time interval accumulation unit extracts and holds each of signals of time intervals each including each signal transmitted by another radio communication apparatus, from the frequency converted baseband signal, based on an instruction by a timing management unit. A time interval combining unit weights and combines the respective signals of time intervals accumulated in the time interval accumulation unit, and increases a signal power. Combining algorithms include, for example, Minimum Mean Square Error (MMSE) algorithm and the like. A demodulation unit performs demodulation processing on the combined signal to obtain demodulated information.

In a case that the radio communication apparatus on the reception side in a radio communication system includes the reception unit illustrated in FIG. 11, for example, when the radio communication apparatus on the reception side can correctly demodulate the received signal, the radio communication apparatus sends an Ack back to the radio communication apparatus on the transmission side. The radio communication apparatus on the transmission side continues to repeatedly transmit the same signal until receiving the Ack from the radio communication apparatus on the reception side. As a result, even if the radio wave environment is negatively affected and becomes outside the serving range, the radio communication apparatus on the reception side can continue to combine the radio waves of the retransmitted signal, and thereby, increase the signal power to recover the connection.

CITATION LIST

Non Patent Literature

NPL 1: Takeshi Hattori, Masanobu Fujioka, "Revised wireless broadband textbook 3.5G/NextGen Mobile", Inpress, 2006, p. 118-123

SUMMARY OF THE INVENTION

Technical Problem

In the configuration illustrated in FIG. 11, it is assumed that, in the timing management unit, at which timing a signal transmitted from which radio communication apparatus arrives, is known. For example, the timing management unit acquires a table of signal transmission times in some way in advance, and obtains the transmission timing for each of the radio communication apparatuses by referring to the table. However, in an unlicensed band actively utilized for the IoT, various radio communication apparatuses autonomously and dispersively transmit signals. As such, the radio communication apparatus on the reception side does not know at which timing a signal transmitted from which radio communication apparatus arrives. In a conventional configuration, a signal arriving at a timing other than the known timings does not allow synchronization detection with the table of signal transmission times, and thus, the signals of time intervals in which the desired signal is included cannot be appropriately held in the time interval accumulation unit, and the time interval combining unit may not increase the signal power. As such, it may not be possible to recover to a state capable of reception outside the serving range.

In light of the foregoing, an object of the present invention is to provide a radio communication apparatus and a radio signal reception method capable of successfully receiving radio signals from a communication target whose signal transmission timing is unknown even in a poor radio wave environment.

Means for Solving the Problem

An aspect of the present invention is a radio communication apparatus including a reception unit configured to receive wirelessly a signal configured with a preamble from another radio communication apparatus; a synchronization detection unit configured to use the preamble included in the signal received by the reception unit to detect synchronization with the another radio communication apparatus, a signal accumulation unit configured to accumulate a signal extracted from the signal received by the reception unit based on a timing at which the synchronization is detected by the synchronization detection unit, a combining unit configured to combine signals accumulated in the signal accumulation unit in accordance with a blind adaptive array antenna algorithm, and a demodulation unit configured to demodulate the signals combined by the combining unit.

An aspect of the present invention is the radio communication apparatus described above, wherein the combining unit uses a constant modulus algorithm (CMA) algorithm as the algorithm.

An aspect of the present invention is the radio communication apparatus described above, wherein the combining unit calculates weights on the respective signals accumulated in the signal accumulation unit, selects a predefined number of weights from the weights in descending order of absolute values of the weights, and applies the selected weights to the corresponding signals to combines the signals.

An aspect of the present invention is the radio communication apparatus described above, wherein the combining unit calculates weights on the respective signals accumulated in the signal accumulation unit, selects a predefined number of weights from the weights in descending order of absolute values of the weights, recalculates weights on the signals corresponding to the selected weights, and applies the recalculated weights to the corresponding signals to combine the signals.

An aspect of the present invention is the radio communication apparatus described above, wherein the combining unit calculates weights on the respective signals accumulated in the signal accumulation unit, selects weights of which absolute values exceed a threshold from among the calculated weights, and applies the selected weights to the corresponding signals to combine the signals.

An aspect of the present invention is the radio communication apparatus described above, wherein the combining unit calculates weights on the respective signals accumulated in the signal accumulation unit, selects weights of which absolute values exceed a threshold from among the calculated weights, recalculates weights on the signals corresponding to the selected weights, and applies the recalculated weights to the corresponding signals to combine the signals.

An aspect of the present invention is the radio communication apparatus described above further including an interference replica signal generation unit configured to generate an interference replica signal based on information demodulated by the demodulation unit, and a subtraction unit configured to subtract the replica signal generated by the interference replica signal generation unit from each of the signals accumulated in the signal accumulation unit, wherein the combining unit combines the signals from each of which the replica signal is subtracted by the subtraction unit in accordance with the blind adaptive array antenna algorithm.

An aspect of the present invention is a radio signal reception method including receiving wirelessly a signal configured with a preamble from another radio communication apparatus, using the preamble included in the signal received in the receiving of the signal to detect synchronization with the another radio communication apparatus, accumulating a signal extracted from the signal received in the receiving of the signal based on a timing at which the synchronization is detected in the detecting of the synchronization, combining signals accumulated in the accumulating of the signal in accordance with a blind adaptive array antenna algorithm, and demodulating the signals combined in the combining of the signals.

Effects of the Invention

According to the present invention, a radio signal can be successfully received from a communication target whose signal transmission timing is unknown even in a poor radio wave environment.

DESCRIPTION OF EMBODIMENTS

Hereinafter, embodiments of the present invention will be described in detail with reference to the drawings.

First Embodiment

Figure 1:
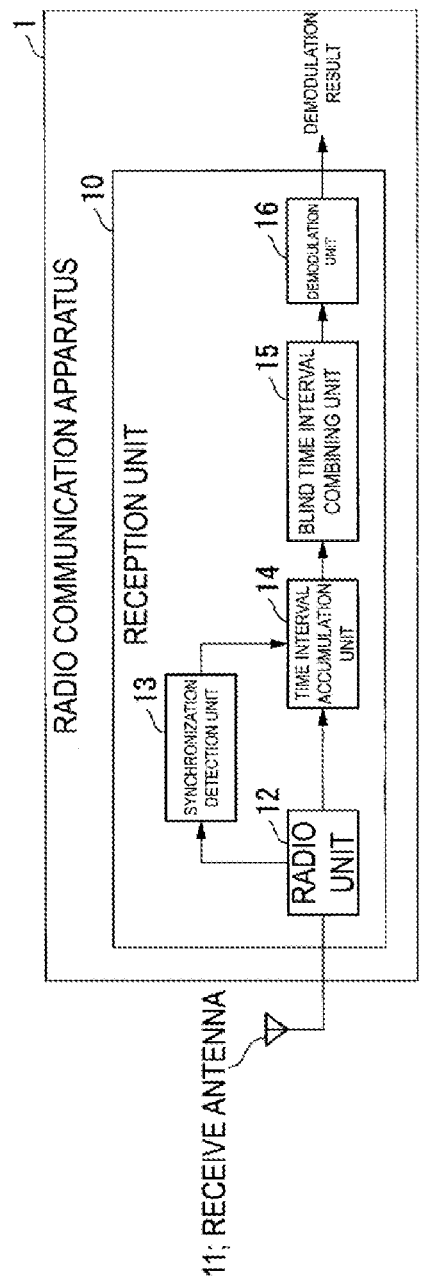
FIG. 1 is a diagram illustrating a configuration example of a reception unit included in a radio communication apparatus in a first embodiment according to the present invention.
Figure 11:
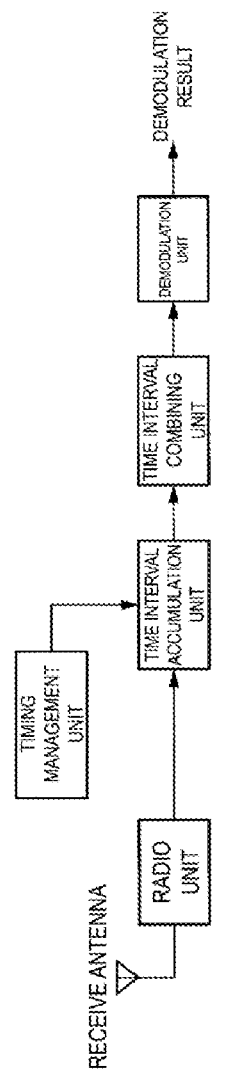
FIG. 11 is a diagram illustrating a configuration example of a reception unit included in a conventional communication apparatus.

FIG. 1 is a diagram illustrating a configuration example of a reception unit 10 included in a radio communication apparatus 1 in a first embodiment. The reception unit 10 illustrated in the figure has a configuration for chase combining signals to improve received signal power, the signals being received in an environment in which a plurality of radio communication apparatuses autonomously and dispersively transmit signals each including one defined preamble. The reception unit 10 includes a receive antenna 11, a radio unit 12, a synchronization detection unit 13, a time interval accumulation unit 14, a blind time interval combining unit 15, and a demodulation unit 16. The configuration of the reception unit 10 illustrated in FIG. 11 differs from the configuration of the reception unit of the related art illustrated in FIG. 11 in including the synchronization detection unit 13 instead of the timing management unit and including the blind time interval combining unit 15 instead of the time interval combining unit.

The receive antenna 11 receives signals transmitted by another radio communication apparatus. The radio unit 12 performs frequency conversion on the signal received by the receive antenna 11 to obtain a baseband signal. The synchronization detection unit 13 utilizes the preamble included in the received signal to detect the signal transmitted from another radio communication apparatus. The time interval accumulation unit 14 extracts and accumulates the baseband signal in a predetermined time interval from the frequency converted baseband signal in accordance with a timing of detection by the synchronization detection unit 13. The extracted baseband signal is described as a time interval signal. The blind time interval combining unit 15 weights and combines the respective time interval signals accumulated in the time interval accumulation unit 14, and increases a signal power. The demodulation unit 16 performs demodulation processing on the signal combined by the blind time interval combining unit 15 to obtain demodulated information.

Figure 2:
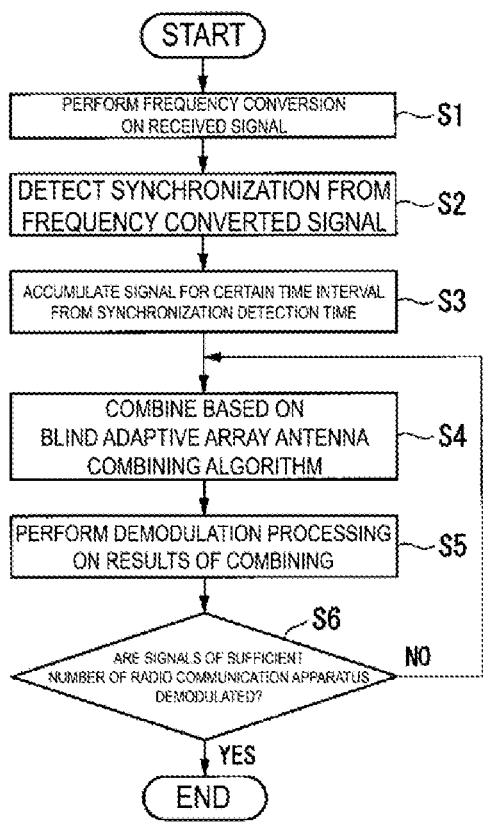
FIG. 2 is a flowchart illustrating an example of processing by the reception unit in the first embodiment.

FIG. 2 is a flowchart illustrating an example of processing by the reception unit 10 included in the radio communication apparatus 1 illustrated in FIG. 1. In a radio communication system to which a radio communication apparatus including the reception unit 10 illustrated in FIG. 1 belongs, a plurality of radio communication apparatuses can autonomously and dispersively communicate and all of the radio communication apparatuses may utilize one defined preamble. Examples of such radio communication standards include IEEE802.15.4g (see, for example, Reference document 1).

(Reference document 1) IEEE Std 802.15.4g, "Part 15.4: Low-Rate Wireless Personal Area Networks (LR-WPANs) Amendment 3: Physical Layer (PHY) Specifications for Low-Data-Rate, Wireless, Smart Metering Utility Networks", 2012 April.

The radio unit 12 performs frequency conversion on the radio signal received by the receive antenna 11 from another radio communication apparatus to obtain a baseband signal (step S1). The synchronization detection unit 13 calculates a correlation value between the received baseband signal and the known preamble. The synchronization detection unit 13 determines a synchronization detection in a case that the calculated correlation value exceeds a threshold value, and finds out a timing of the synchronization detection and notifies the time interval accumulation unit 14 of the timing (step S2). Because when and which radio communication apparatus transmits a signal is not known at all, the synchronization detection unit 13 performs the synchronization detection every time the signal is received.

The time interval accumulation unit 14 cuts out the baseband signal for a predetermined time interval from the timing (time) of the synchronization detection notified by the synchronization detection unit 13 to extract the time interval signal. The time interval accumulation unit 14 accumulates the extracted time interval signal (step S3). A length of the time interval or a length of the time interval signal may be determined based on a temporal length of a transmit signal in the radio communication system in which this embodiment is used.

The blind time interval combining unit 15 applies a blind adaptive array antenna algorithm to a time interval signal group accumulated in the time interval accumulation unit 14 and combines the signal group (step S4). For example, a constant modulus algorithm (CMA) can be used as the blind adaptive array antenna algorithm. The CMA is an algorithm that performs weighting combining on the outputs of the plurality of array elements so that an amplitude of results of the combining is constant as much as possible. The CMA is effective in a case of a signal waveform at the time of transmission close to a constant amplitude, such as in a case of Gaussian frequency-shift keying (GFSK) modulation, for example. An algorithm other than CMA may also be used as the blind adaptive array antenna algorithm. Example of available techniques include a known blind adaptive array antenna algorithm such as a power inverse (PI) method and a multi-target CMA derived from the CMA or the PI (see, e.g., Reference document 2). By applying the blind adaptive array antenna algorithm, even in a case that the signals of a plurality of radio communication apparatuses are accumulated in the time interval accumulation unit 14, signals can be combined such that the power of the signal only of one radio communication apparatus can be enhanced.

(Reference document 2) Y. FUJINO, D. UCHIDA, T. FUJITA, O. KAGAMI and K. WATANABE, "A Subspace Estimation Method based on Eigenvalue Decomposition for Multi-Target Constant Modulus Algorithm", in Proc. WCNC, 2007, pp. 1232-1236

The demodulation unit 16 performs demodulation processing on the signal obtained by the combining by the blind time interval combining unit 15 to obtain demodulated information (step S5). In a case that the demodulation unit 16 determines that the signals of a sufficient number of radio communication apparatuses to be demodulated are not demodulated (step S6: NO), the reception unit 10 returns to step S4 to repeat the processing. At this time, as described in Reference document 2, the reception unit 10 uses a weight different from the previous time to perform signal combining so that a signal of a radio communication apparatus is obtained that is not the signal of the radio communication apparatus that has been previously demodulated.

In a case that the demodulation unit 16 determines that the signals of a sufficient number of radio communication apparatuses to be demodulated are demodulated (step S6: YES), the processing is terminated. Note that, for example, an authentication process may be performed between a plurality of radio communication apparatuses in advance, and the maximum number of radio communication apparatuses that can communicate may be a sufficient number of radio communication apparatuses to be demodulated. For example, an operator may preset a sufficient number of radio communication apparatuses to be demodulated to the number of radio communication apparatuses included in the radio communication system to which the present embodiment is applied.

Figure 3:
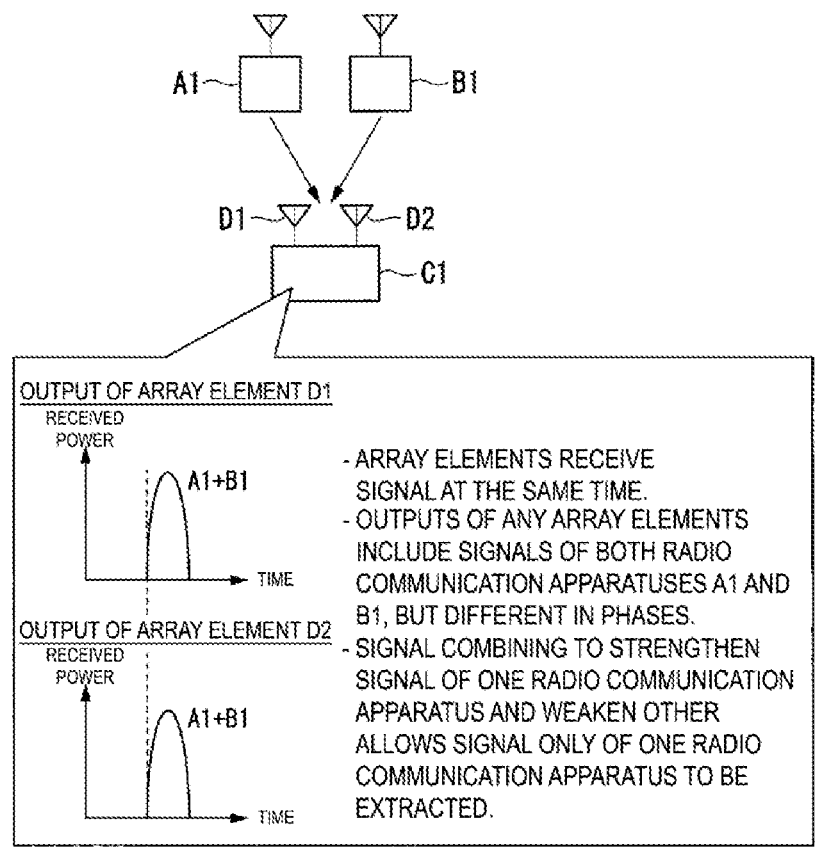
FIG. 3 is a diagram illustrating a case that an adaptive array antenna algorithm is applied to outputs of a plurality of array elements.
Figure 4:
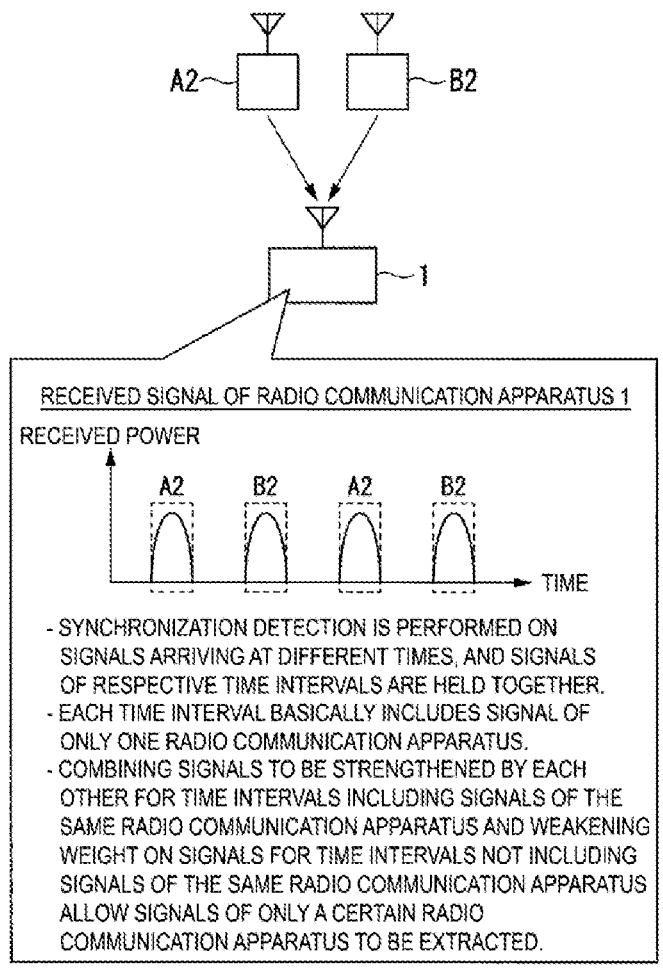
FIG. 4 is a diagram illustrating a case that the adaptive array antenna algorithm is applied to a time interval to be combined in chase combining in the first embodiment.

With reference to FIGS. 3 and 4, differences are described between the case of applying the adaptive array antenna algorithm to the outputs of a plurality of array elements and the case of applying to the time interval to be combined in the chase combining.

FIG. 3 is a diagram illustrating the case that the adaptive array antenna algorithm is applied to the outputs of a plurality of array elements. In the figure, a radio communication apparatus A1 and a radio communication apparatus B1 simultaneously transmit radio signals. In a case that the radio signal from the radio communication apparatus A1 is a desired wave, the radio signal from the radio communication apparatus B1 is an interference wave. In a case that the radio signal from the radio communication apparatus B1 is a desired wave, the radio signal from the radio communication apparatus A1 is an interference wave. A radio communication apparatus C on the reception side includes a plurality of array elements D1 and D2. A desired wave and an interference wave arrive at the same time at any of the plurality of array elements D1 and D2. However, due to differences in spatial positions of the array elements, the desired and interference waves overlap each other in different phases in the outputs of the respective array elements D1 and D2. The radio communication apparatus C appropriately weights the outputs of the array elements D1 an D2, and then, combines the outputs. In other words, the radio communication apparatus C in-phase combines the outputs of the array elements for the desired wave, and reversed-phase combines the output of the array elements for the interference wave. The outputs obtained by the combining include a signal increased in signal power for the desired wave and a signal decreased in the signal power for the interference wave, where improvement in reception sensitivity can be expected.

FIG. 4 is a diagram illustrating a case that the adaptive array antenna algorithm is applied to a time interval to be combined in chase combining. In the present embodiment, the time interval is used instead of the array element illustrated in FIG. 3. In the figure, the radio communication apparatus 1 receives radio signals transmitted by radio communication apparatuses A2 and B2. The present embodiment assumes an environment in which a plurality of radio communication apparatuses operate autonomously and dispersive. In this environment, unlike the case illustrated in FIG. 3, all of the time interval signals accumulated in the time interval accumulation unit 14 of the radio communication apparatus 1 do not include both the desired wave and the interference wave, and thus, various cases are assumed such as a case that only the desired wave is included, a case that only the interference wave is included, and a case that both the desired and interference waves are included. Even if all cases are included, it is assumed that the desired waves and interference waves are very unlikely to fully overlap, and thus are now considered to have been received at different times.

The synchronization detection unit 13 performs the synchronization detection of signals arriving at different times, and holds together the signals of the respective time intervals. As described above, each time interval basically includes the signal of only one radio communication apparatus. The blind time interval combining unit 15 combines the signals to be strengthened by each other for the time intervals including the signals of the same radio communication apparatus and weakens the weight on the signals for the time intervals not including the signals of the same radio communication apparatus to allow the signals of only a certain radio communication apparatus to be extracted.

As described above, the characteristics of the targeted signals are different between the case of applying the adaptive array antenna algorithm to the outputs of a plurality of array elements and the case of applying to the accumulated time interval signals. As such, experiments were performed to verify whether the signal power is improved according to the present embodiment.

Figure 5:
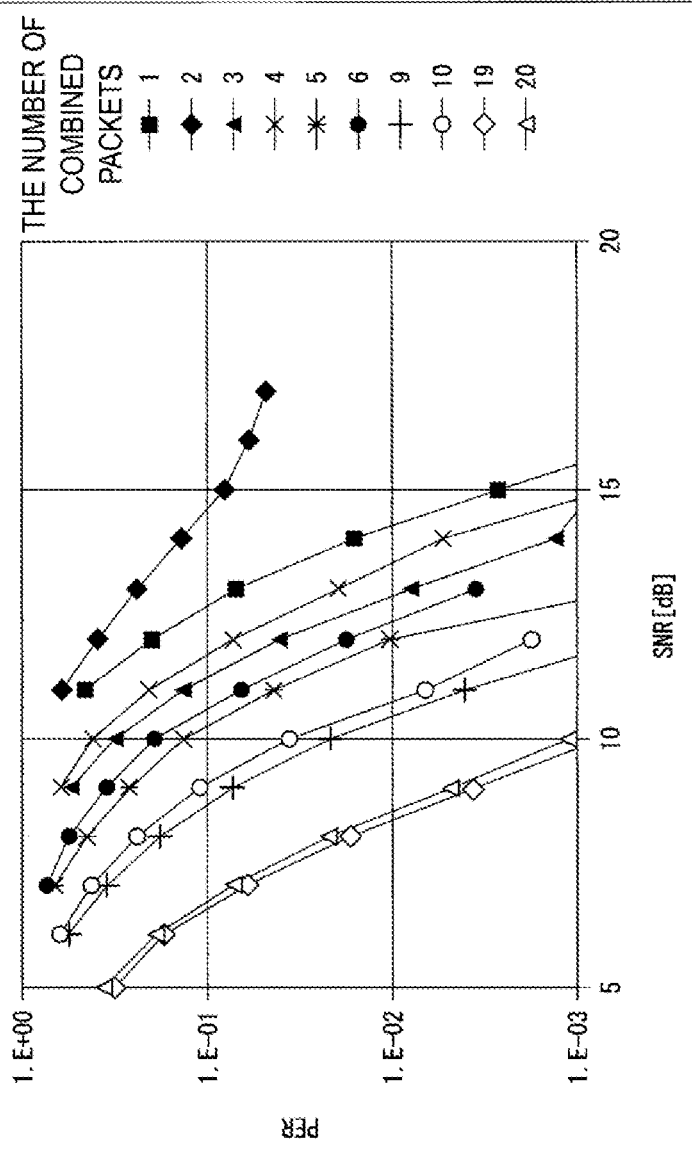
FIG. 5 is a diagram illustrating a signal-to-noise ratio and a packet error rate when the chase combining is performed by the reception unit in the first embodiment.

FIG. 5 is a diagram illustrating a signal-to-noise ratio (SNR) and a packet error rate (PER) when the chase combining is performed by the reception unit 10 illustrated in FIG. 1. In the figure, it is assumed that one packet of radio signal comes alternately from a radio communication apparatus A and a radio communication apparatus B to the radio communication apparatus 1. In addition, the packets transmitted by the radio communication apparatuses A and B were unchanged. The radio communication apparatus 1 performs the synchronization detection of signals in order of arrival by the synchronization detection unit 13, and accumulated the signals in the time interval accumulation unit 14. Then, the blind time interval combining unit 15 combined the predetermined number of combined packets from a head of the accumulated time interval signals according to the adaptive array antenna algorithm. Specifically, when the number of combined packets is three, two signals from the radio communication apparatus A and one signal from the radio communication apparatus B are combined.

A horizontal axis in FIG. 5 represents the SNR of one packet before being combined and a vertical axis represents the PER of the radio communication apparatus A. As illustrated in the figure, the PER is increased in a case of two combined packets as compared to a case of one combined packet. This is because, the signal only of the radio communication apparatus A is included in the case of one combined packet, whereas the signal of the radio communication apparatus B is included as an interference wave in the case of two combined packets. Ideally, even in the case of two combined packets, if a weight on the packet of the radio communication apparatus A is 1 and a weight on the packet of the radio communication apparatus B is 0, the same result as the case of one combined packet is obtained. However, degradation is present as illustrated in the graph because of a weight calculation error due to interference.

In a case that the number of combined packets is increased to 3, the power of the packet of radio communication apparatus A is improved and the PER is reduced. In a case that the number of combined packets is increased to 4, the PER is again increased because the packet of the radio communication apparatus B increases as an interference wave. As the number of combined packets is further increased, the PER is reduced and an amount of degradation thereof is reduced even in the case that the interference wave increases. The reason why the amount of degradation is reduced is because the signal power increases and the weight calculation error decreases. As described above, it can be seen from the experimental results illustrated in FIG. 5 that, in the present embodiment, although a group of the accumulated time interval signals rather than a plurality of array elements is targeted to be combined, the effects of signal power improvement and interference power reduction can be obtained.

Figure 6:
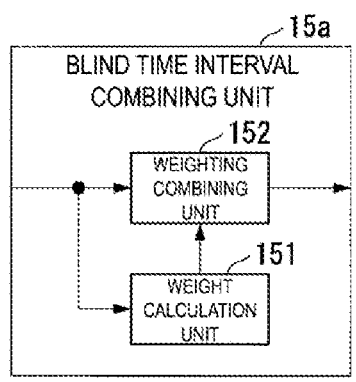
FIG. 6 is a diagram illustrating a configuration of a blind time interval combining unit in the first embodiment.
Figure 7:
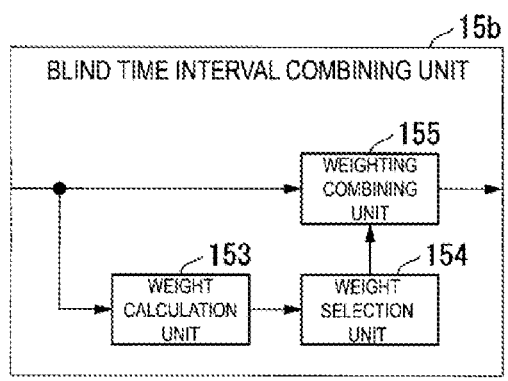
FIG. 7 is a diagram illustrating a configuration of the blind time interval combining unit in the first embodiment.
Figure 8:
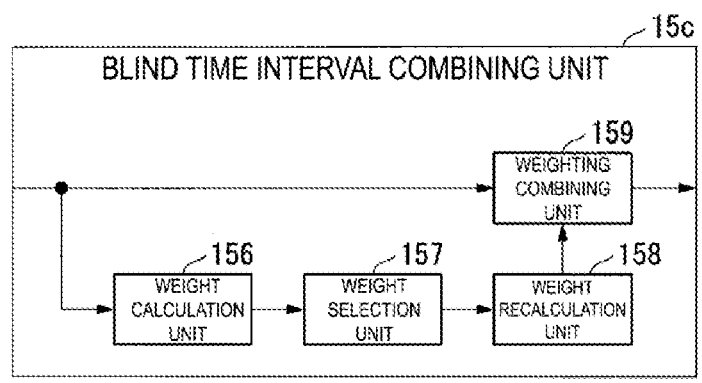
FIG. 8 is a diagram illustrating a configuration of the blind time interval combining unit in the first embodiment.

FIGS. 6 to 8 are diagrams each illustrating a detailed example of a configuration of the blind time interval combining unit 15 illustrated in FIG. 1. A blind time interval combining unit 15a illustrated in FIG. 6, a blind time interval combining unit 15b illustrated in FIG. 7, or a blind time interval combining unit 15c illustrated in FIG. 8 can be used as the blind time interval combining unit 15 illustrated in FIG. 1.

FIG. 6 is a diagram illustrating a configuration of the blind time interval combining unit 15a. The blind time interval combining unit 15a includes a weight calculation unit 151 and a weighting combining unit 152. The weight calculation unit 151 performs weight calculation using the time interval signal group input from the time interval accumulation unit 14, and calculates a weight on each time interval signal. The weighting combining unit 152 performs weighting combining on each time interval signal using the time interval signal group input from the time interval accumulation unit 14 and the weight calculated by the weight calculation unit 151, and outputs the result.

FIG. 7 is a diagram illustrating a configuration of the blind time interval combining unit 15b. The blind time interval combining unit 15b includes a weight calculation unit 153, a weight selection unit 154, and a weighting combining unit 155. The weight calculation unit 153 calculates a weight on each time interval signal in the same manner as the weight calculation unit 151 in FIG. 6. The weight selection unit 154 selects only some of the weights calculated by the weight calculation unit 153. The weighting combining unit 155 weights the time interval signal group input from the time interval accumulation unit 14 using the weight calculated by the weight selection unit 154 to combine the group. Note that the weight selection unit 154 may leave the selected weight without change and rewrite the not-selected weight into zero (or a value close to zero) to output the resultant to the weighting combining unit 155. The weighting combining unit 155 uses the weight received from the weight selection unit 154 to weight and combine each time interval signal.

Unlike using a plurality of array elements, in the case of using the accumulated time interval signals, a time interval signal including no desired wave may be present. By eliminating a time interval signal that is likely to not include a desired wave according to a criterion, the effects of the signal power improvement can be expected to be further improved. Examples of the criteria for the weight selection unit 154 to select some of the weights include a method for selecting a predefined number of weights from among the weights calculated by the weight calculation unit 153 in descending order of absolute values of the weights. The predetermined number of weights may be set to an upper limit value of the number of transmissions or retransmissions in the radio communication system in which the present embodiment is used, for example. Examples of the criteria to select some of the weights also include a method for selecting weights of which absolute values exceed a predefined threshold from among the weights calculated by the weight calculation unit 153. The predefined threshold may be set between 0 and 1 in a case that the all weights are normalized by use of the weight having the most absolute value.

FIG. 8 is a diagram illustrating a configuration of the blind time interval combining unit 15c. The blind time interval combining unit 15c includes a weight calculation unit 156, a weight selection unit 157, a weight recalculation unit 158, and a weighting combining unit 159. The weight calculation unit 156 calculates a weight on each time interval signal in the same manner as the weight calculation unit 151 in FIG. 6 and the weight selection unit 154 in FIG. 7. The weight selection unit 157 selects some of the weights in the same manner as the weight selection unit 154 in FIG. 7. After the weight selection unit 157 selects the weight, the weight recalculation unit 158 uses only the time duration signal associated with the selected weight to anew perform the weight calculation. The weighting combining unit 159 uses the weight calculated by the weight recalculation unit 158 to weight and combine the input time interval signal group. Note that the weight recalculation unit 158 may set the weight not selected by the weight selection unit 157 to zero (or a value close to zero) to output the resultant to the weighting combining unit 159. The weighting combining unit 159 uses the weight received from the weight recalculation unit 158 to weight and combine each time interval signal.

In the weight calculation by the weight calculation unit 156, the weight calculation error is increased because a time interval signal that is likely not to include the desired wave is also considered. For this reason, after selecting only the time interval signal likely to include the desired wave by the weight selection unit 157, the weight recalculation unit 158 anew performs the weight calculation, and thereby, obtaining a weight with a small weight calculation error. Examples of the criteria for the weight selection unit 157 to select some of the weights include, in the same manner as the weight selection unit 154 in FIG. 7, a method for selecting a predefined number of weights in descending order of absolute values of the weights and a method of selecting weights of which absolute values exceed a predefined threshold, from among the weights calculated by the weight calculation unit 156.

Second Embodiment

Figure 9:
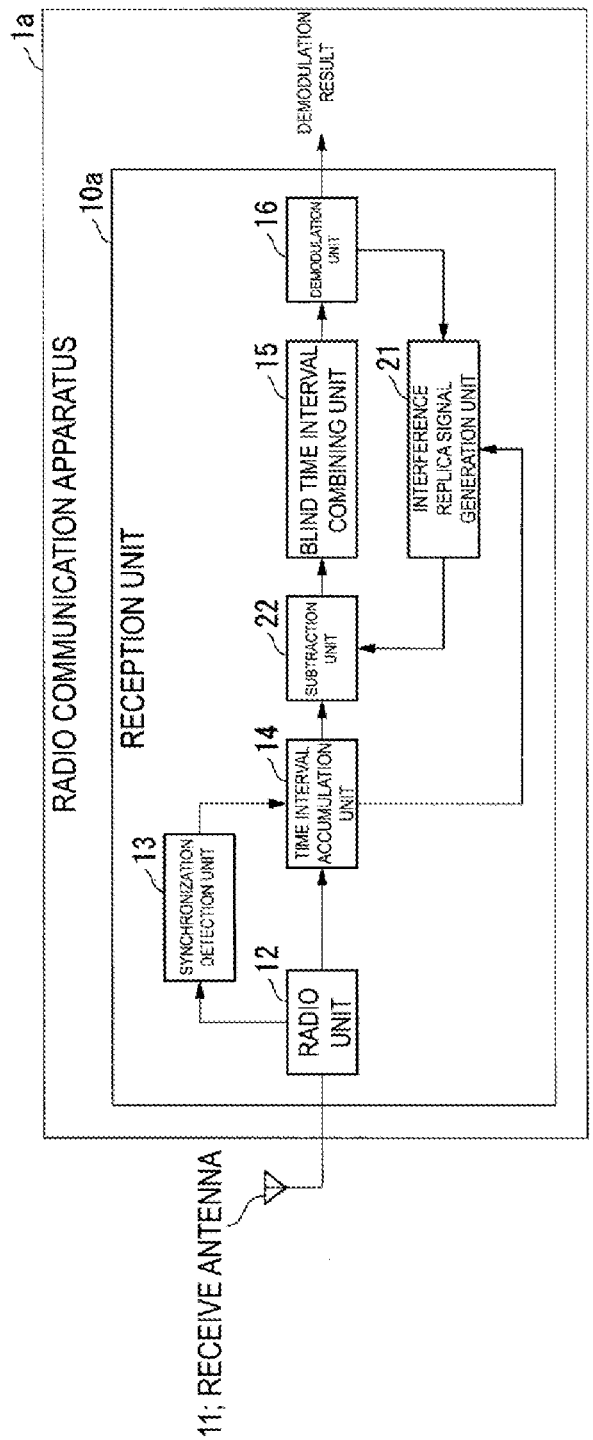
FIG. 9 is a diagram illustrating a configuration example of a reception unit included in a radio communication apparatus in a second embodiment.

A radio communication apparatus of the present embodiment has a function of interference cancellation in addition to the function of the first radio communication apparatus. FIG. 9 is a diagram illustrating a configuration example of a reception unit 10a included in a radio communication apparatus 1a in a second embodiment. In the figure, the same components as those of the radio communication apparatus 1 according to the first embodiment illustrated in FIG. 1 are denoted by the same reference signs and descriptions thereof are omitted. The radio communication apparatus 1a illustrated in FIG. 9 is different from the radio communication apparatus 1 illustrated in FIG. 1 in further including an interference replica signal generation unit 21 and a subtraction unit 22. As illustrated in FIG. 5, the weight calculation error due to interference degrades the PER. Thus, the reception unit 10a having the configuration illustrated in FIG. 9 demodulates in advance the packet from the radio communication apparatus transmitting the interference wave in order to reduce interference. The interference replica signal generation unit 21 uses the demodulated information obtained through the demodulation processing by the demodulation unit 16 to generate an interference replica signal. The subtraction unit 22 subtracts the generated interference replica signal from the time interval signal accumulated in the time interval accumulation unit 14, and outputs the resultant to the blind time interval combining unit 15.

Figure 10:
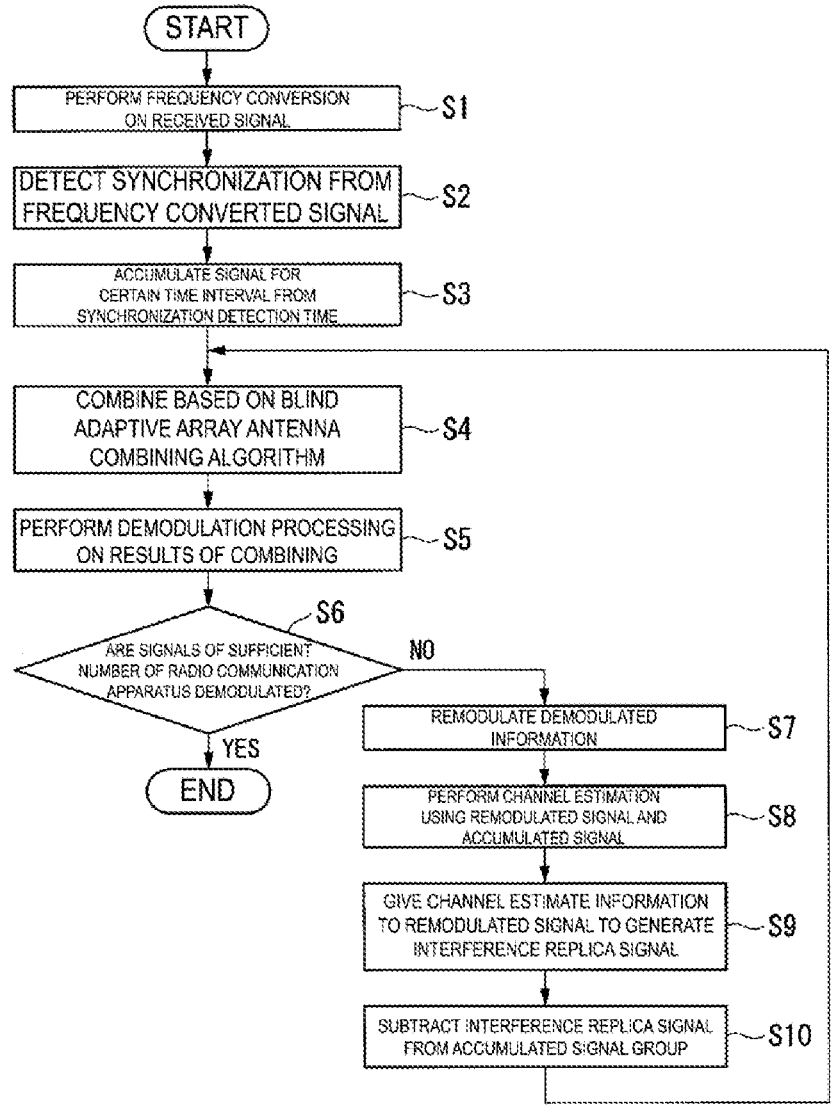
FIG. 10 is a flowchart illustrating an example of processing by the reception unit in the second embodiment.

FIG. 10 is a flowchart illustrating an example of processing by the reception unit 10a included in the radio communication apparatus 1a illustrated in FIG. 9. In the figure, the same prescribed as those in the flowchart according to the first embodiment illustrated in FIG. 2 are denoted by the same reference signs and detailed descriptions thereof are omitted.

The radio communication apparatus 1a demodulates the signal in the same manner as in the configuration illustrated in FIG. 2 (step S1 to step S5). In other words, the radio unit 12 performs frequency conversion on the radio signal received by the receive antenna 11 to obtain a baseband signal. The synchronization detection unit 13 calculates a correlation value between the received baseband signal and the known preamble, and finds out a timing of the synchronization detection when the calculated correlation value exceeds a threshold value. The time interval accumulation unit 14 accumulates the time interval signals from which the baseband signal for a predetermined time interval is cut off in accordance with the timing of the synchronization detection output from the synchronization detection unit 13. The blind time interval combining unit 15 applies the blind adaptive array antenna algorithm to a time interval signal group accumulated in the time interval accumulation unit 14 and combines the signal group. The demodulation unit 16 performs demodulation processing on the signal obtained by the combining by the blind time interval combining unit 15 to obtain demodulated information.

In the case that the demodulation unit 16 determines that the signals of a sufficient number of radio communication apparatuses to be demodulated are not demodulated (step S6: NO), the interference replica signal generation unit 21 remodulates demodulated signal sequence indicated by the demodulated information (step S7). Furthermore, the interference replica signal generation unit 21 uses the remodulated signal to perform channel estimation on the time interval signal accumulated in the time interval accumulation unit 14 (step S8). The channel estimation may be obtained, for example, by performing a correlation operation in the time domain, or may be obtained by applying a zero forcing (ZF) algorithm or the MMSE algorithm in the frequency domain. The interference replica signal generation unit 21 gives a channel estimation result for each time interval signal to the remodulated signal. This allows the interference replica signal generation unit 21 to generate an interference replica signal corresponding to each accumulated time interval signal (step S9).

The subtraction unit 22 subtracts the interference replica signal generated correspondingly to the time interval signal in step S9 from each of the time interval signals accumulated in the time interval accumulation unit 14 to reduce the interference (step S10). The time interval accumulation unit 14 outputs the time interval signal with the reduced interference to the blind time interval combining unit 15. The reception unit 10a performs the processing from step S4. Then, in a case that the demodulation unit 16 determines that the signals of a sufficient number of radio communication apparatuses to be demodulated are demodulated (step S6: NO), the processing is terminated.

By using the reception unit 10a having the configuration illustrated in FIG. 9, the error rate can be further reduced compared to the reception unit 10 having the configuration illustrated in FIG. 1. For example, when the number of combined packets is increased as illustrated in FIG. 5, the error rate deteriorates when the interference wave is caught, but the deterioration amount can be reduced by using the reception unit 10a having the configuration in FIG. 9.

According to the embodiment described above, the radio communication apparatus calculates the correlation value between the received baseband signal and the known preamble signal, and finds out the timing at which the calculated correlation value exceeds the threshold as a synchronization signal. The radio communication apparatus determines the time interval according to the found out synchronization signal, and applies the blind adaptive array antenna algorithm to perform the chase combining. This allows the radio communication apparatus to increase the signal power using the chase combining and successfully receive signals even in a poor radio wave environment, even in the case that at which timing the transmission signals from another radio communication apparatus arrives is unknown. Accordingly, in an environment in which a plurality of terminals autonomously and dispersively transmit signals, the radio communication apparatus can appropriately combine the retransmitted signals to increase the received signal power, and thereby, recover the connection outside the serving range due to the negatively affected radio wave environment.

According to the above-described embodiment, the radio communication apparatus includes a reception unit, a synchronization detection unit, a signal accumulation unit, a combining unit, and a demodulation unit. The reception unit receives wirelessly a signal configured with a preamble from another radio communication apparatus. The reception unit is, for example, the receive antenna 11 and the radio unit 12. The synchronization detection unit uses the preamble included in the signal received by the reception unit to detect synchronization with another radio communication apparatus. The signal accumulation unit extracts a signal from the signal received by the reception unit based on a timing at which the synchronization is detected by the synchronization detection unit, and accumulates the extracted signal. The signal accumulation unit is, for example, the time interval accumulation unit 14. The combining unit combines the signals accumulated in the signal accumulation unit in accordance with a blind adaptive array antenna algorithm. The combining unit is, for example, the blind time interval combining unit 15. The demodulation unit demodulates the signals combined by the combining unit.

The combining unit may calculate weights on the respective signals accumulated in the signal accumulation unit, select a predefined number of weights in descending order of absolute values of the weights or weights of which absolute values exceed a threshold, apply the selected weights to the corresponding signals to weight the signals, and combine the signals. Alternatively, the combining unit may calculate weights on the respective signals accumulated in the signal accumulation unit, select a predefined number of weights in descending order of absolute values of the weights or weights of which absolute values exceed a threshold, recalculate weights on the respective signals corresponding to the selected weights, apply the recalculated weights to the corresponding signals to weight the signals, and combine the signals.

The radio communication apparatus may further include an interference replica signal generation unit and a subtraction unit. The interference replica signal generation unit generates an interference replica signal based on demodulated information demodulated by the demodulation unit. The subtraction unit subtracts the replica signal generated by the interference replica signal generation unit from each of the signals accumulated in the signal accumulation unit. The combining unit combines the signals from each of which the replica signal is subtracted by the subtraction unit in accordance with a blind adaptive array antenna algorithm.

The embodiments of the present invention have been described above in detail with reference to the drawings. However, specific configurations are not limited to those embodiments, and include any design or the like within the scope not departing from the gist of the present invention.

REFERENCE SIGNS LIST 1, 1a Radio communication apparatus
0, 10a Reception unit
11 Receive antenna
12 Radio unit
13 Synchronization detection unit
14 Time interval accumulation unit
15, 15a, 15b, 15c Blind time interval combining unit
16 Demodulation unit
21 Interference replica signal generation unit
22 Subtraction unit
151, 153, 156 Weight calculation unit
157, 154 Weight selection unit
158 Weight recalculation unit
152, 155, 159 Weighting combining unit

The invention claimed is:

1. A radio communication apparatus comprising:
a processor; and
a storage medium having computer program instructions stored thereon, when executed by the processor, perform to:
receive wirelessly a signal configured with a preamble from another radio communication apparatus;
use the preamble included in the signal to detect synchronization with the another radio communication apparatus;
accumulate signals extracted from the signal based on a timing at which the synchronization is detected;
calculate weights on the respective accumulated signals;
selects a predefined number of weights from the weights in descending order of absolute values of the weights;
applies the selected weights to the corresponding accumulated signals to combine signals in accordance with a blind adaptive array antenna algorithm; and
demodulate the combined signals.

2. The radio communication apparatus according to claim 1, wherein the computer program instructions further perform to use a constant modulus algorithm (CMA) as the algorithm.

3. The radio communication apparatus according to claim 1, wherein the computer program instructions further perform to
generate an interference replica signal based on information from the demodulated signals; and
subtract the interference replica signal from each of the accumulated signals and combine the accumulated signals in accordance with the blind adaptive array antenna algorithm.

4. A radio communication apparatus comprising:
a processor; and
a storage medium having computer program instructions stored thereon, when executed by the processor, perform to:
receive wirelessly a signal configured with a preamble from another radio communication apparatus;
use the preamble included in the signal to detect synchronization with the another radio communication apparatus;
accumulate signals extracted from the signal based on a timing at which the synchronization is detected;
calculate weights on the respective accumulated signals,
selects a predefined number of weights from the weights in descending order of absolute values of the weights,
recalculates weights on the accumulated signals corresponding to the selected weights,
applies the recalculated weights to the corresponding accumulated signals to combine signals in accordance with a blind adaptive array antenna algorithm; and
demodulate the combined signals.

5. The radio communication apparatus according to claim 4, wherein the computer program instructions further perform to use a constant modulus algorithm (CMA) as the algorithm.

6. The radio communication apparatus according to claim 4, wherein the computer program instructions further perform to
generate an interference replica signal based on information from the demodulated signals; and
subtract the interference replica signal from each of the accumulated signals and combine the accumulated signals in accordance with the blind adaptive array antenna algorithm.

7. A radio communication apparatus comprising:
a processor; and
a storage medium having computer program instructions stored thereon, when executed by the processor, perform to:
receive wirelessly a signal configured with a preamble from another radio communication apparatus;
use the preamble included in the signal to detect synchronization with the another radio communication apparatus;
accumulate signals extracted from the signal based on a timing at which the synchronization is detected;
calculate weights on the respective accumulated signals,
selects weights of which absolute values exceed a threshold from among the calculated weights,
applies the selected weights to the corresponding accumulated signals to combine signals in accordance with a blind adaptive array antenna algorithm; and
demodulate the combined signals.

8. The radio communication apparatus according to claim 7, wherein the computer program instructions further perform to use a constant modulus algorithm (CMA) as the algorithm.

9. The radio communication apparatus according to claim 7, wherein the computer program instructions further perform to
generate an interference replica signal based on information from the demodulated signals; and
subtract the interference replica signal from each of the accumulated signals and combine the accumulated signals in accordance with the blind adaptive array antenna algorithm.

10. A radio communication apparatus comprising:
a processor; and
a storage medium having computer program instructions stored thereon, when executed by the processor, perform to:
receive wirelessly a signal configured with a preamble from another radio communication apparatus;
use the preamble included in the signal to detect synchronization with the another radio communication apparatus;
accumulate signals extracted from the signal based on a timing at which the synchronization is detected;
calculate weights on the respective accumulated signals,
selects weights of which absolute values exceed a threshold from among the calculated weights,
recalculates weights on the accumulated signals corresponding to the selected weights,
applies the recalculated weights to the corresponding accumulated signals to combine signals in accordance with a blind adaptive array antenna algorithm; and
demodulate the combined signals.

11. The radio communication apparatus according to claim 10, wherein the computer program instructions further perform to use a constant modulus algorithm (CMA) as the algorithm.

12. The radio communication apparatus according to claim 10, wherein the computer program instructions further perform to
generate an interference replica signal based on information from the demodulated signals; and
subtract the interference replica signal from each of the accumulated signals and combine the accumulated signals in accordance with the blind adaptive array antenna algorithm.

* * * * *